US007360710B2

(12) United States Patent
Lindahl et al.

(10) Patent No.: US 7,360,710 B2
(45) Date of Patent: *Apr. 22, 2008

(54) STORED-VALUE CARD WITH CHAMBER

(75) Inventors: Kim O. Lindahl, Minneapolis, MN (US); Jamie Parker, St. Paul, MN (US); Erin M. Borkowski, Andover, MN (US); Tim D. Schumann, Arden Hills, MN (US); Primoz Samardzija, Marina del Rey, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/735,789

(22) Filed: Apr. 16, 2007

(65) Prior Publication Data
US 2007/0241186 A1 Oct. 18, 2007

Related U.S. Application Data

(63) Continuation of application No. 11/404,367, filed on Apr. 14, 2006, now Pat. No. 7,316,357.

(51) Int. Cl.
*G06K 19/00* (2006.01)
*G06K 19/06* (2006.01)
*G06K 5/00* (2006.01)
*G06Q 40/00* (2006.01)
*G07D 11/00* (2006.01)
*G07F 19/00* (2006.01)

(52) U.S. Cl. .................. 235/487; 235/379; 235/380; 235/492; 235/493

(58) Field of Classification Search ........... 235/379, 235/380, 487, 492, 493
See application file for complete search history.

(56) References Cited

U.S. PATENT DOCUMENTS 1,679,106 A * 7/1928 Weinstein ................... 84/379

(Continued)

FOREIGN PATENT DOCUMENTS

EP 1516656 3/2005

(Continued)

OTHER PUBLICATIONS

Halbur et al., "Stored-Value Card With Housed Object," U.S. Appl. No. 11/404,584, filed Apr. 14, 2006 (47 pages).

*Primary Examiner*—Daniel I Walsh
(74) *Attorney, Agent, or Firm*—Ingrassia Fisher & Lorenz, P.C.

(57) ABSTRACT

A stored-value card includes a first housing member, a second housing member, and an account identifier. The first housing member defines a chamber, and the second housing member defines a cavity. The second housing member is coupled with the first housing member to place the chamber and the cavity in communication with each other and to enclose the chamber and the cavity between the first housing member and the second housing member. The first housing member and the second housing member collectively define a housing. The account identifier is coupled with the housing, is machine readable, and is adapted to link the stored-value card to a financial account or a financial record. Financial transaction cards, methods of promoting sales of stored-value cards, methods of using a stored-value card and other embodiments are also disclosed.

22 Claims, 8 Drawing Sheets

U.S. PATENT DOCUMENTS

| | | | |
|---|---|---|---|
| 4,562,342 A | 12/1985 | Solo | |
| 4,677,835 A | 7/1987 | Almblad | |
| 5,308,121 A | 5/1994 | Gunn | |
| 5,326,964 A * | 7/1994 | Risser | 235/487 |
| 5,328,026 A * | 7/1994 | Newman | 206/234 |
| 5,503,434 A * | 4/1996 | Gunn | 283/67 |
| 5,538,291 A | 7/1996 | Gustafson | |
| 5,627,355 A * | 5/1997 | Rahman et al. | 235/380 |
| 5,769,213 A * | 6/1998 | Chatterton | 206/38 |
| 6,032,866 A | 3/2000 | Knighton et al. | |
| 6,070,990 A | 6/2000 | Dalton et al. | |
| 6,076,296 A | 6/2000 | Schaeffer | |
| 6,132,125 A | 10/2000 | Lin | |
| 6,193,163 B1 * | 2/2001 | Fehrman et al. | 235/488 |
| 6,305,609 B1 * | 10/2001 | Melzer et al. | 235/487 |
| 6,571,940 B2 * | 6/2003 | Newman | 206/38 |
| 6,620,017 B1 | 9/2003 | Bitton | |
| 6,688,935 B1 * | 2/2004 | Lin | 446/15 |
| 6,808,514 B2 * | 10/2004 | Schneider et al. | 604/232 |
| 6,883,718 B1 * | 4/2005 | Le et al. | 235/492 |
| 6,908,358 B2 * | 6/2005 | Lin | 446/16 |
| 7,004,398 B1 * | 2/2006 | Francis et al. | 235/486 |
| 7,024,807 B2 | 4/2006 | Street | |
| 7,055,740 B1 | 6/2006 | Schultz et al. | |
| 7,234,639 B2 * | 6/2007 | Schultz et al. | 235/380 |
| 7,264,155 B2 * | 9/2007 | Halbur et al. | 235/380 |
| 7,275,683 B2 * | 10/2007 | Lazarowicz et al. | 235/375 |
| 7,290,713 B2 * | 11/2007 | Dean et al. | 235/487 |
| 7,290,714 B2 * | 11/2007 | Halbur et al. | 235/487 |
| 7,316,357 B2 * | 1/2008 | Lindahl et al. | 235/487 |
| 2001/0030863 A1 * | 10/2001 | Contant et al. | 362/154 |
| 2002/0053594 A1 * | 5/2002 | Haney et al. | 235/381 |
| 2003/0107884 A1 | 6/2003 | Krietzman et al. | |
| 2003/0123253 A1 | 7/2003 | Krietzman et al. | |
| 2003/0201331 A1 * | 10/2003 | Finkelstein | 235/487 |
| 2004/0046035 A1 | 3/2004 | Davila et al. | |
| 2004/0144846 A1 | 7/2004 | Lasch et al. | |
| 2004/0259459 A1 | 12/2004 | Bitton | |
| 2005/0006463 A1 * | 1/2005 | Stephenson | 235/380 |
| 2005/0029349 A1 * | 2/2005 | McGregor et al. | 235/439 |
| 2005/0059314 A1 * | 3/2005 | Lin | 446/16 |
| 2005/0155618 A1 * | 7/2005 | Lafferty | 132/104 |
| 2005/0204600 A1 * | 9/2005 | Lauer et al. | 40/594 |
| 2005/0247795 A1 * | 11/2005 | Riedl et al. | 235/488 |
| 2006/0118616 A1 * | 6/2006 | Schultz et al. | 235/380 |
| 2006/0157554 A1 * | 7/2006 | Halbur et al. | 235/380 |
| 2006/0157555 A1 * | 7/2006 | Dean et al. | 235/380 |
| 2006/0157556 A1 * | 7/2006 | Halbur et al. | 235/380 |
| 2006/0161439 A1 | 7/2006 | Selg et al. | |
| 2006/0208062 A1 * | 9/2006 | Osborn et al. | 235/380 |
| 2006/0231609 A1 * | 10/2006 | Lazarowicz et al. | 235/380 |
| 2006/0245815 A1 * | 11/2006 | Chakmakian | 401/131 |
| 2006/0283479 A1 | 12/2006 | Kernot | |
| 2006/0289655 A1 * | 12/2006 | Schultz et al. | 235/487 |
| 2007/0022647 A1 * | 2/2007 | Miller et al. | 40/654.01 |
| 2007/0023531 A1 * | 2/2007 | Halbur et al. | 235/493 |
| 2007/0169387 A1 * | 7/2007 | Glass | 40/124.03 |
| 2007/0182155 A1 * | 8/2007 | Duffy | 283/116 |
| 2007/0241186 A1 * | 10/2007 | Lindahl et al. | 235/380 |
| 2007/0241197 A1 * | 10/2007 | Lindahl et al. | 235/487 |
| 2007/0241198 A1 * | 10/2007 | Halbur et al. | 235/487 |
| 2007/0290052 A1 * | 12/2007 | Dean et al. | 235/492 |

FOREIGN PATENT DOCUMENTS

GB    2 277 482    11/1994

* cited by examiner

STORED-VALUE CARD WITH CHAMBER

CROSS-REFERENCE TO RELATED APPLICATION

This application is a continuation of and claims priority under 35 U.S.C. § 120 to U.S. Utility patent application Ser. No. 11/404,367, entitled "STORED-VALUE CARD WITH BUBBLE WAND," having a filing date of Apr. 14, 2006 now U.S. Pat. No. 7, 316,357, which is hereby incorporated by reference.

BACKGROUND OF THE INVENTION

Stored-value cards and other financial transaction cards come in many forms. A gift card, for example is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card like other stored-value cards, can be "recharged" or "reloaded" at the direction of the bearer. The balance associated with the card declines as the card is used, encouraging repeat visits to the retailer or other provider issuing the card. Additionally, the card generally remains in the users purse or wallet, serving as an advertisement or reminder to revisit the associated retailer. Stored-value cards provide a number of advantages to both the consumer and the retailer.

SUMMARY OF THE INVENTION

One aspect of the present invention relates to a stored-value card including a first housing member, a second housing member, and an account identifier. The first housing member defines a chamber, and the second housing member defines a cavity. The second housing member is coupled with the first housing member to place the chamber and the cavity in communication with each other and to enclose the chamber and the cavity between the first housing member and the second housing member. The first housing member and the second housing member collectively define a housing. The account identifier is coupled with the housing, is machine readable, and is adapted to link the stored-value card to a financial account or a financial record. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services e.g. a retail store or website. According to one embodiment, an original consumer buys a stored-value card to give a recipient who in turn is able to use the stored-value card at a retail store or setting to pay for the goods and/or services. A stored-value card, according to embodiments of the present invention, provides the consumer and recipient with extra amusement addition to the ability to pay for goods and/or services with the stored-value card.

In particular, the stored-value card presents the original consumer or a recipient with a container for receiving a bubble solution and a bubble wand. During use, the bubble wand can be inserted into the bubble solution, removed from the bubble solution, and waved or blown to produce bubbles, thereby amusing the consumer or recipient as well as any other observers. In one embodiment, the additional amusing aspect of the stored-value card promotes the sale and/or loading of the stored-value card by potential consumers and/or bearers of the stored-value card.

Figure 1A:
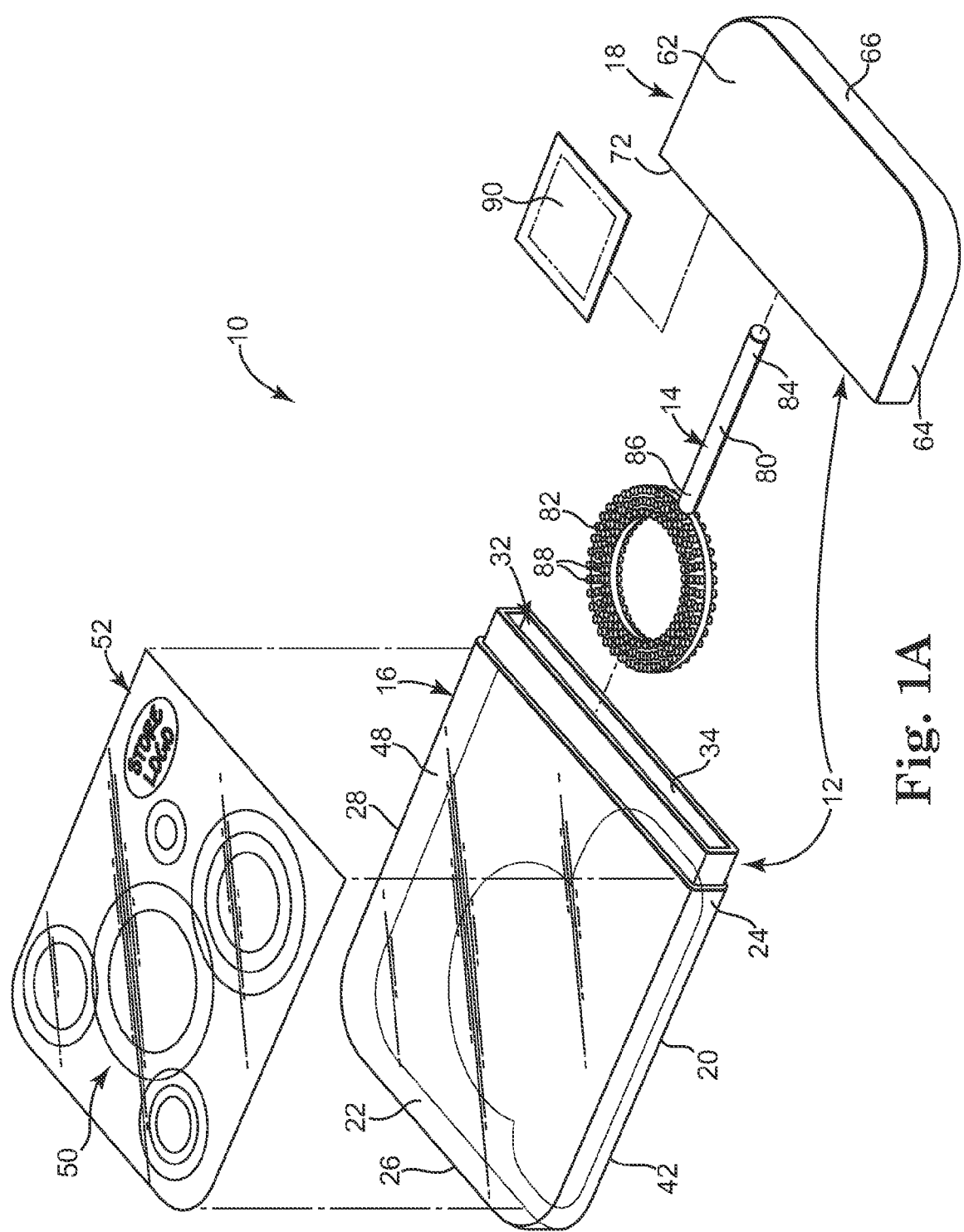
FIG. 1A is an exploded, right side, perspective view of one embodiment of a stored value card, according to the present invention.
Figure 1B:
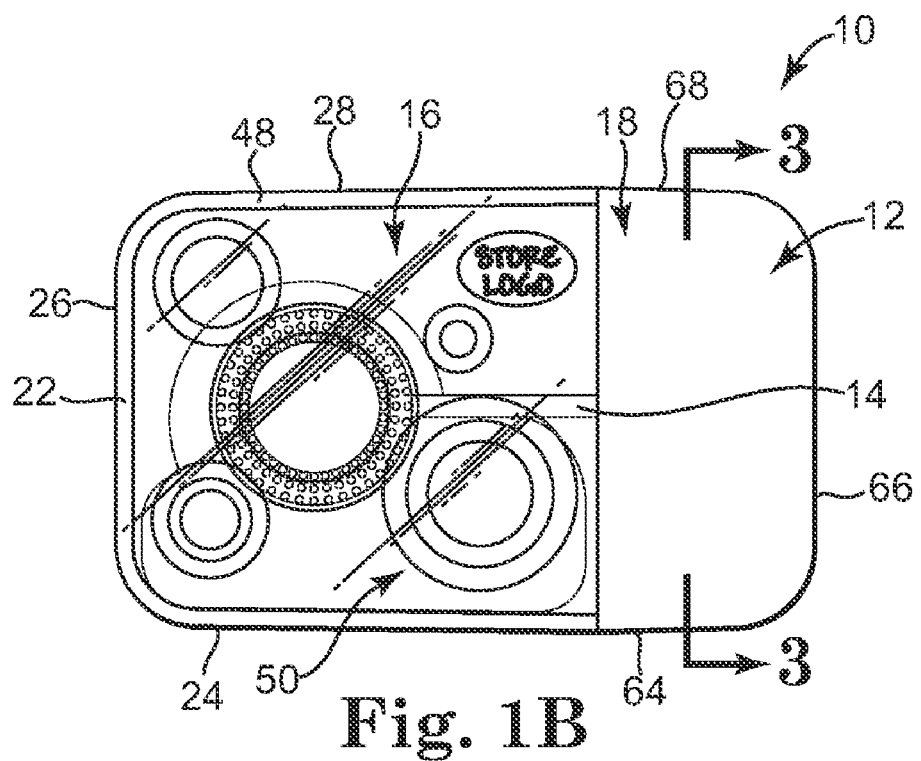
FIG. 1B is a front view of the stored-value card of FIG. 1A.
Figure 1C:
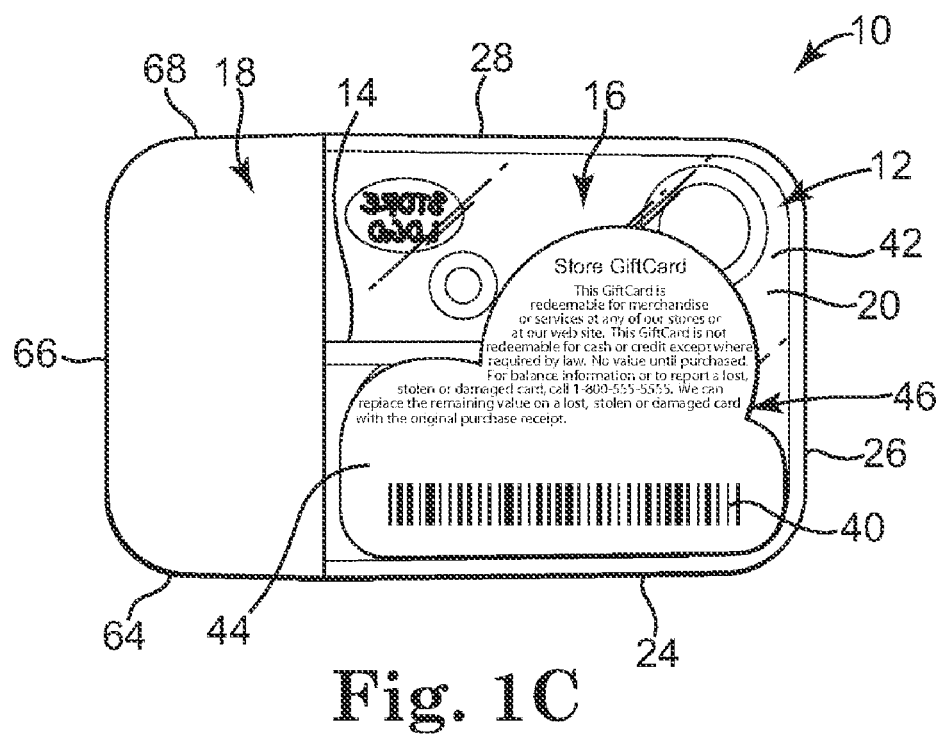
FIG. 1C is a back view of the stored-value card of FIG. 1A.

Turing to the figures, FIGS. 1A-1C each illustrate one embodiment of a stored-value card 10 according to the present invention. The stored-value card 10 includes a housing 12 and a bubble wand or other bubble blowing device 14. Housing or enclosure 12 is configured to housing bubble wand 14. In one embodiment, housing 12 includes a first housing member 16 and a second housing member 18 configured to be selectively coupled with first housing member 16. In one embodiment, bubble wand 14 is mounted to second housing member 18 and is configured to extend into first housing member 16 when housing members 16 and 18 are coupled together.

First housing member 16 includes first and second major panels 20 (FIG. 1C) and 22 spaced from and extending substantially parallel with one another. In one embodiment, major panels 20 and 22 are each substantially planar and are similarly sized and shaped. In one embodiment, each major panel 20 and 22 is substantially rectangular. Side walls 24, 26, and 28 each extend from a different side of and between major panels 20 and 22. More specifically, where major panels 20 and 22 are substantially rectangular, first side wall 24 extends substantially parallel to third side wall 28. Second side wall 26 extends between first and third side walls 24 and 28. In view of this configuration, first housing member 16 defines a chamber 32, which is substantially enclosed except for an opening 34 formed opposite second side wall 26.

In one embodiment, a flange 36 extends around opening 34. In particular, flange 36 extends from ends of first and second major panel 20 and 22 and first and third side walls 24 and 28 that are opposite second side wall 26. Flange 36 extends substantially parallel to, but inwardly offset from each of major panel 20 and 22 and side walls 24 and 28, away from second side wall 26.

In one embodiment, first housing member 16 is formed by injection molding a plastic, acrylic styrene, or any other suitable material to define the various attributes of first housing member 16. In one embodiment, first housing member 16 is translucent or transparent. In one example, first housing member 16 is found to be substantially rigid.

An account identifier 40 is included on first housing member 16. Account identifier 40 indicates a financial account or record to which stored-value card 10 is linked. The account or record maintains the monetary balance on stored-value card 10 and is optionally stored on a database, other electronic or manual record-keeping system, or in the case of "smart" cards for example, on a chip or other electronic device on stored-value card 10 itself. Accordingly, by scanning account identifier 40, a financial account or record linked to stored-value card 10 is identified and can subsequently be activated, have amounts debited therefrom, and/or having amounts added thereto. In view of the above, account identifier 40 is one example of means for linking stored-value card 10 with a financial account or record.

In one embodiment, account identifier 40 is included on an outside surface 42 of first major panel 20 and is in the form of a bar code, magnetic strip, smart chip or other electronic device, radio frequency identification (RFID) device, or other suitable device or marking readily readable by a point-of-sale terminal, account access station, kiosk, or other suitable device. In one example, where first housing member 16 is translucent or transparent, an opaque field 44 is printed or otherwise applied to outside surface 42 and is configured to be printed with account identifier 40. In the case of a bar code account identifier 40, opaque field 44 facilitates scanning of account identifier 40.

In one embodiment, redemption indicia 46 are included on outside surface 42 of first housing member 16, such as on opaque field 44. Redemption indicia 46 indicate that stored-value card 10 is redeemable for the purchase of goods and/or services, and that, upon use, a value of the purchased goods and/or services will be deducted from a financial account or record linked to a stored-value card 10. In one embodiment, redemption indicia 46 includes phrases such as "<NAME OF STORE> GiftCard" and "This GiftCard is redeemable for merchandise or services at any of our stores or at our website," and/or provides help or telephone information in a case of a lost, stolen, or damaged stored-value card, etc.

In one embodiment, other indicia are printed or otherwise disposed on one or more of outside surface 42 of first major panel 20 and an outside surface 48 of second major panel 22. Other indicia may be included on first housing member 16 such as other objects, text, backgrounds, graphics, brand identifiers, etc. In one example, additional indicia 50 are disposed on outside surface 48 via a face panel 52. Face panel 52 is printed with indicia 50 and is configured to be adhered or otherwise attached to outside surface 48. In one embodiment, face panel 52 is formed of polyester printed with acrylic resin or with any other suitable material and/or method of including indicia 50.

In one example, additional indicia 50 include decorative and/or informative items, such as objects relating to the nature of the stored-value card 10. More specifically, in view of the inclusion of bubble wand 14 in housing 12, indicia 50 may include illustrations or other depictions of bubbles. In one example, face panel 52 is translucent or substantially transparent such that the contents, if any, of first housing member 16 can be viewed through not only face panel 52 but also econd major panel 22. In one embodiment, indicia 50 may alternatively or additionally identify a brand associated with a stored-value card 10, such as identifying a product brand, a store brand or logo, etc. Other suitable combinations or selections of indicia 50 to be displayed on face panel 52 are also contemplated.

Figure 2:
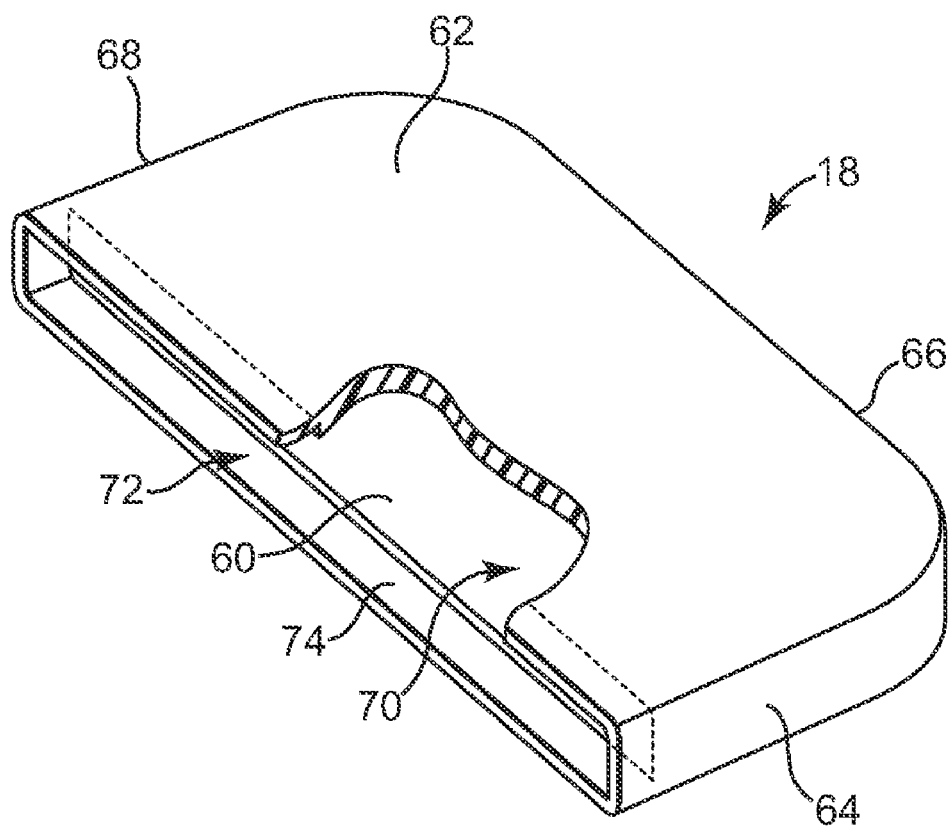
FIG. 2 is a left side, perspective view of one embodiment of a first housing member and a bubble wand, according to the present invention.
Figure 3:
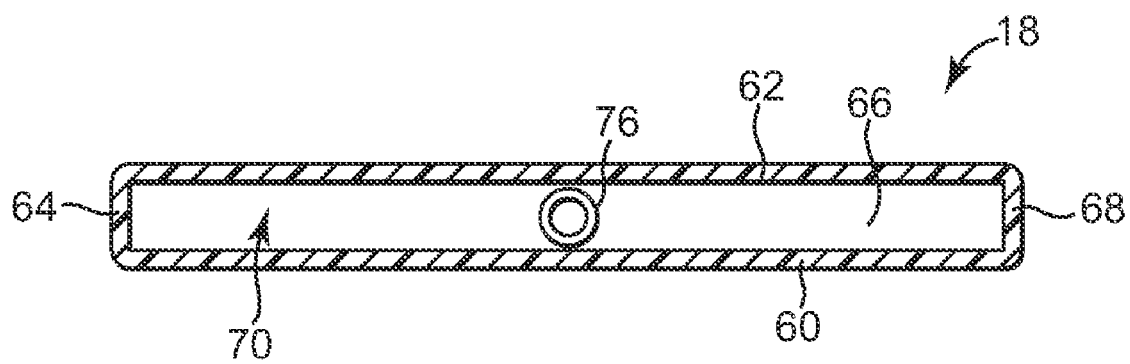
FIG. 3 is a cross-sectional view illustration of the first housing member of FIG. 1B taken along the line 3-3.

Referring to FIGS. 2 and 3, second housing member 18 includes first and second major panels 60 and 62. In one embodiment, major panels 60 and 62 are substantially planar and are spaced from and extend substantially parallel with one another. Major panels 60 and 62 are similarly sized and shaped. For instance, in one example, each major panel 60 and 62 is substantially rectangular. Side walls 64, 66, and 68 each extend from a different side of and between major panels 60 and 62. More specifically, first side wall 64 extends substantially parallel to third side wall 68. Second side wall 66 extends between first and third side walls 64 and 68. In view of this configuration, second housing member 18 defines a cavity 70, which is substantially enclosed except for an opening 72 formed opposite second side wall 66.

Major panels 60 and 62 and first and third side walls 64 and 68 each define an area of reduced thickness 74 near and around opening 72. Areas of reduced thickness 74 are visible only from the inside of second housing member 18. In one embodiment, areas of reduced thickness 74 extend from opening 72 a distance similar to a distance flange 36 extends from opening 34 of first housing member 16. As such, areas of reduced thickness are configured to receive flange 36 of first housing member 16 as will be further described below.

In one example, a coupling feature 76 is positioned within second housing member 18 for receiving bubble wand 14. In one embodiment, coupling feature 76 is a hollow cylinder extending from second side wall 66 as illustrated with additional reference to the cross-sectional view of FIG. 3. In one embodiment, second housing member 18 is substantially rigid and is formed by injection molding a plastic such as high-impact polystyrene or any other suitable material to define the various attributes of second housing member 18. In one embodiment, second housing member is substantially opaque.

Referring to FIG. 1A, bubble wand 14 is any device suitable for creating bubbles when dipped in the bubble solution. In one embodiment, bubble wand 14 includes a linear, elongated shaft 80 and a ring 82. Shaft 80 defines a first end 84 and a second end 86 opposite first end 84. Ring 82 extends from second end 86 away from first end 84. In one embodiment, ring 82 includes a plurality of protrusions 88 or other features to further facilitate the creation of bubbles as will be further described below.

In one embodiment, stored-value card 10 includes a packet 90 containing at least a portion of the ingredients needed to make a bubble solution. In one embodiment, packet 90 includes a bubble power configured to become a bubble solution when mixed with water. In one embodiment, packet 90 includes a concentrated form of bubble solution that is expanded by the addition of water. Packet 90 is sized and shaped to fit within cavity 70 of second housing member 18. In other embodiments, no packet 90 is included in stored-value card 10.

During assembly, bubble wand 14 is coupled with second housing member 18. In particular, first end 84 of bubble wand 14 is received by coupling feature 76 of second housing member 18. As such, coupling feature 76 is one example of means for coupling bubble wand 14 with housing 12. First end 84 may be secured within coupling feature 76 by a snap-fit connection, with adhesive, and/or with any other suitable attachment device or substance. Packet 90, if any, is placed within cavity 70 near first end 84 of bubble wand 14. In one example, packet 90 is maintained in position by friction fit or in any other suitable manner. In view of the above, second housing member 16 with cavity 70 is one example of means for receiving a prepackaged portion of a bubble solution where the prepackaged portion becomes the bubble solution when mixed with water.

Following positioning of bubble wand 14 and/or packet 90 within second housing member 18, second housing member 18 is coupled with first housing member 16. In one embodiment, first housing member 16 is slid toward and together with second housing member 18 such that flange 36 of first housing member 16 is received by the areas of reduced thickness 74 of second housing member 18. As such, first and second housing members 16 and 18 collectively define housing 12 with bubble wand 14 being maintained therein. More specifically, second side wall 26 of first housing member 16 and second side wall 66 of second housing member 18 each independent define an opposite, external end walls of housing 12. First and second housing members 16 and 18 collectively define opposite external side walls of housing 12 each extending between side walls 26 and 66. In one embodiment, the resulting housing 12 is substantially rectangular and sized similarly to an identification card, a credit card, or other card sized to fit in a wallet of a user. In one embodiments, housing 12 is shaped as a square, circle, oval, star, or another suitable shape.

During use of stored-value card 10 for entertainment purposes, first and second housing members 16 and 18 are separated and packet 90, if any, is removed from within second housing member 18. A bubble solution is created within cavity 70 of first housing member 16 either from scratch using a known recipe or a recipe otherwise provided to the bearer of stored-value card 10 or by mixing the contents of packet 90 with water. Subsequently, bubble wand 14 is dipped into the chamber 32 and, thereby, the bubble solution such that the bubble solution extends across ring 82 of bubble wand 14. Air is forced across the bubble wand 14, more particularly, ring 82, by blowing on, waving or otherwise manipulating bubble wand 14 to form bubbles.

Figure 4A:
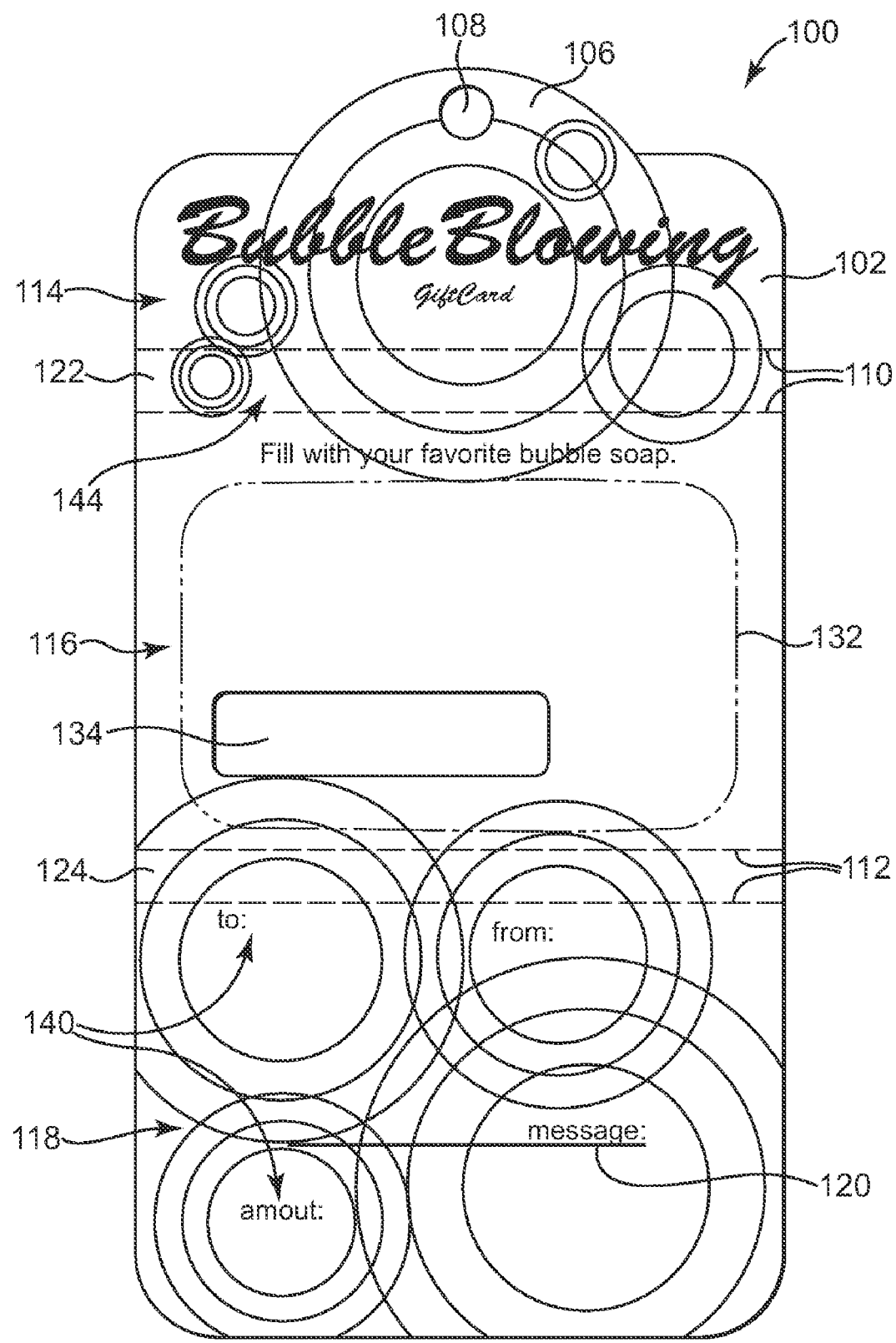
FIG. 4A is a front view of one embodiment of an unfolded carrier for a stored-value card, according to the present invention.
Figure 4B:
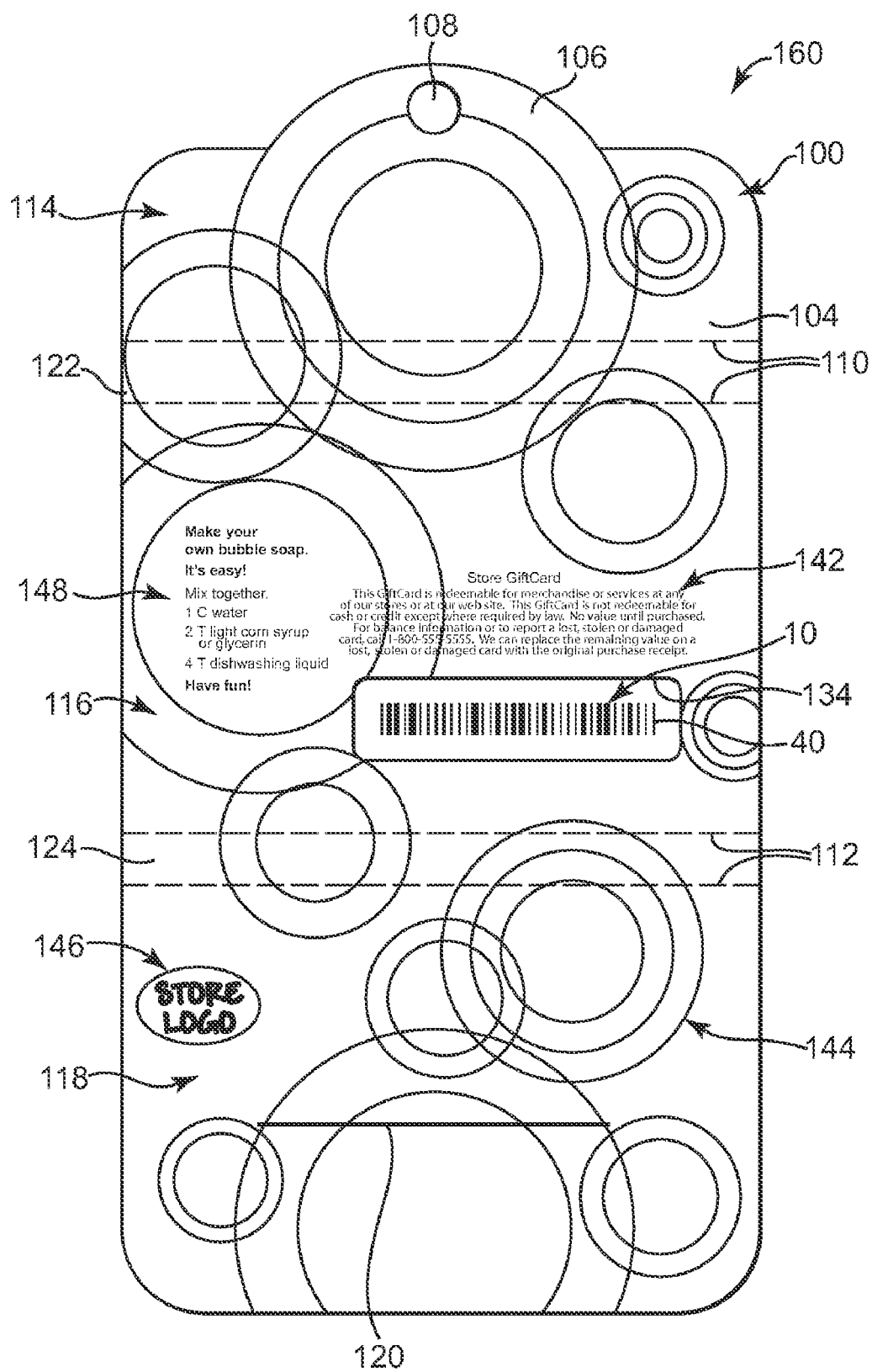
FIG. 4B is a back of the unfolded carrier of FIG. 4A supporting a stored-value card, according to the present invention.
Figure 5:
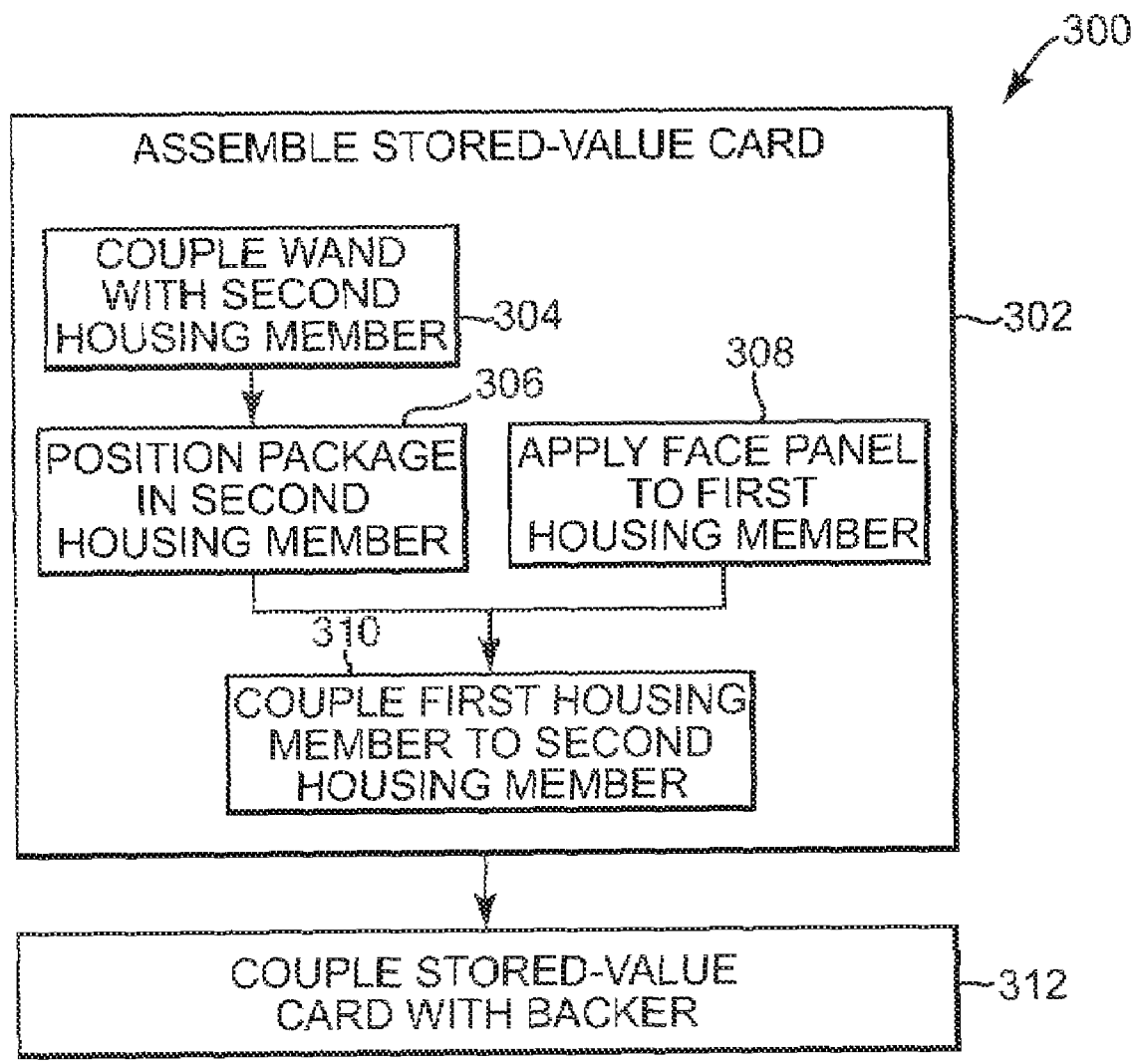
FIG. 5 is a flow chart illustrating one embodiment of a method of assembling a stored-value card, according to the present invention.

FIGS. 4A and 4B illustrate a carrier or backer 100 for supporting stored-value card 10 (FIGS. 1A-1C). Stored-value card 10 is readily releasably attached to backer 100, for example, by an adhesive or the like, and is represented in phantom lines in FIG. 4A. Backer 100 includes a single layer or multiply layers of paper or plastic material, for example, generally in the form of a relatively stiff but bendable/flexible card. Other materials are also contemplated. In one embodiment, backer 100 is generally a planar substrate having a generally elongated or rectangular shape. Accordingly, backer 100 defines a first surface 102 (FIG. 4A) and a second surface 104 (FIG. 4B) opposite first surface 102. A tab 106 is generally centered at a first lateral end of backer 100. In one example, a support arm aperture 108 is defined within tab 106 and is configured to receive a support arm or hook. As such, an open backer 100 can be hung via aperture 108 on the support arm or hook for display in a retail setting.

Fold lines 110 and 112 each extend laterally across backer 100 and are spaced longitudinally from one another. More specifically, fold lines 110 are positioned relatively near tab 106 as compared to fold lines 112. A first panel 114, a second or intermediate panel 116, and a third panel 118 are defined by the position of fold lines 110 and 112. First panel 114 extends from fold lines 110 away from fold line 112 and includes tab 106. Second or intermediate panel 116 extends between fold lines 110 and 112. Third panel 118 extends from fold lines 112 in a direction opposite fold lines 110. A laterally extending slit 120 is laterally centered on third panel 118. In one example, a first transition panel 122 is defined between fold lines 110 and a second transition panel 124 is defined between fold lines 112. In other embodiments, rather than providing multiple fold lines 110, a single fold line 110 is provided. Similarly, in one embodiment, a single fold line 112 is provided as opposed to the multiple fold lines 112 illustrated in FIG. 4A.

In one example, first surface 102 is configured to receive stored-value card 10 (illustrated in FIG. 1) as generally indicated by broken line 132 (FIG. 4A). Stored-value card 10 will be adhered or otherwise coupled to first surface 102 of intermediate panel 116. In one embodiment, backer 100 additionally defines a window or opening 134 for displaying account identifier 40 of stored-value card 10 as illustrated in the rear view of FIG. 4B. As previously described, account identifier 40 is adapted for accessing a financial account or record associated with stored-value card 10 for activating, loading, or debiting from the account or record. Accordingly, opening 134 allows access to account identifier 40 to activate and/or load stored-value card 10 without removing stored-value card 10 from backer 100.

In one embodiment, backer 100 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, first surface 102 includes indicia 140, 142, 144, and/or 146. Indicia 140 include to, from, message, and initial value fields. Indicia 140 instruct an original consumer to write or otherwise depict on backer 100 the name of the recipient, the name of the original consumer or other presenter, a message regarding why stored-value card 10 is being presented, or any other suitable sentiment, and for indicating for what amount is initially stored to the financial transaction account or record associated with stored-value card 10.

Indicia 142 indicate that stored-value card is redeemable for the purchase of goods and/or services and that, upon use, of value of purchased goods and/or services will be deducted from the financial account or record linked to stored-value card 10. In one embodiment indicia 142 include phrases "<NAME OF STORE> GiftCard and "This GiftCard is redeemable for merchandise or services at any of our stores or at our website" and/or provides help or phone line information in case of a lost, stolen, or damaged stored-value card 10, etc.

Indicia 144 are decorative indicia and generally improve the asthetic appeal and marketing draw of backer 100. In one embodiment, indicia 144 are positioned and configured to correspond with or incorporate indicia 50 of stored-value card 10 upon of placement of stored-value card 10 on backer 100. For example, in one embodiment wherein the stored-value card 10 includes indicia 50 depicting a plurality of bubbles (for example, bubbles depicted by a plurality of concentric circles as illustrated in FIG. 1A), decorative indicia 144 may also include a similar or coordinating plurality of bubbles (i.e., concentric circles) to present an overall cohesive visual presentation to a user when stored-value card 10 is placed on backer 100.

Indicia 146 identify a store, brand, department, media title or logo, e.g. a title or logo of a movie, book, television show, video game etc. associated with stored-value card 10, etc. In one embodiment, indicia 146 are additionally or alternatively included on first surface 102 and/or second surface 104 of backer 100. Additional information besides that specifically described and illustrated herein may also be included. Other indicia, e.g. indicia promoting that stored-value card 10 includes bubble wand, bubble packet 90 or general directions as to how to use stored-value card 10, bubble wand, and bubble packet 90 as generally illustrated at 148. In one embodiment, indicia 148 provide instructions on how to mix solution from scratch where no packet 90 is included in stored-value card 10. or also contemplated, any of indicia 140, 142, 144, 146, 148, or other indicia, optionally may appear anywhere on backer 100 or stored-value card 10.

Backer 100 is configured to receive stored-value card 10 on first surface 102 of intermediate panel 116. In particular, stored-value card 10 is releasably adhered or otherwise secured to intermediate panel 116 as indicated generally at 132. In one example, once stored-value card 10 is secured to backer 100, decorative indicia 50 of stored-value card 10 coordinates a decorative indicia 144 of backer 100. In one embodiment, backer 100 is hung from a support arm or hook for display in a retail setting in a manner in which at least stored-value card 10 and the portion of surface 102 of backer 100 is visible to potential consumers. In this manner, potential consumers are able to view stored-value card 10 prior to purchase of stored-valued card 10. In this respect, indicia 144 likely serves to entice a potential consumer to purchase stored-value card 10.

During purchase, account identifier 40 of stored-value card 10 is accessed at a point of sale via opening 134 to activate, load, and/or debit from the account associated with stored-value card 10. After purchase, backer 100 is configured such that after purchase, first panel 114 and third panel 118 are foldable about fold lines 110 and 112, respectively, to enclose or selectively wrap stored-value card 10 as desired. More particularly, third panel 118 is rotated about fold lines 112 so that first surface 102 of third panel 118 is moved towards first surface 102 of intermediate panel 116. Subsequently, first panel 114 is rotated about fold lines 110 so that first surface 102 of first panel 114 is moved toward first surface 102 of intermediate panel 116.

In one embodiment, each fold line 110 and 112 includes two longitudinally spaced fold lines to more easily accommodate the thickness of stored-value card 10 when backer 100 is in a folded position. In this respect, after folding, each of first panel 114, second panel 116, and third panel 118 are positioned to be substantially parallel with and/or overlap one another. For example, first panel 114 at least partially overlaps third panel 118. Tab 106 is slid into slit 120 of third panel 118 to selectively lock backer 100 in a folded or closed position (not shown) about stored-value card 10. Folding of first and third panels 114 and 118 of backer 100 in the opposite directions about fold lines 110 and 112 for display in a retail store is also contemplated.

When in the folded position, stored-value card 10 is selectively wrapped for presentation to a recipient of stored-value card 10. Upon receipt, the recipient unfolds backer 100 to access stored-value card 10. Accordingly recipient or other bearer can use stored-value card 10 as a toy for producing bubbles or as tender in financial transactions. Backers similar to backer 100 can be used with various sizes and shapes of stored-value cards 10. Other backers or packages are also contemplated for supporting and/or substantially enclosing stored-value card 10.

Figure 6:
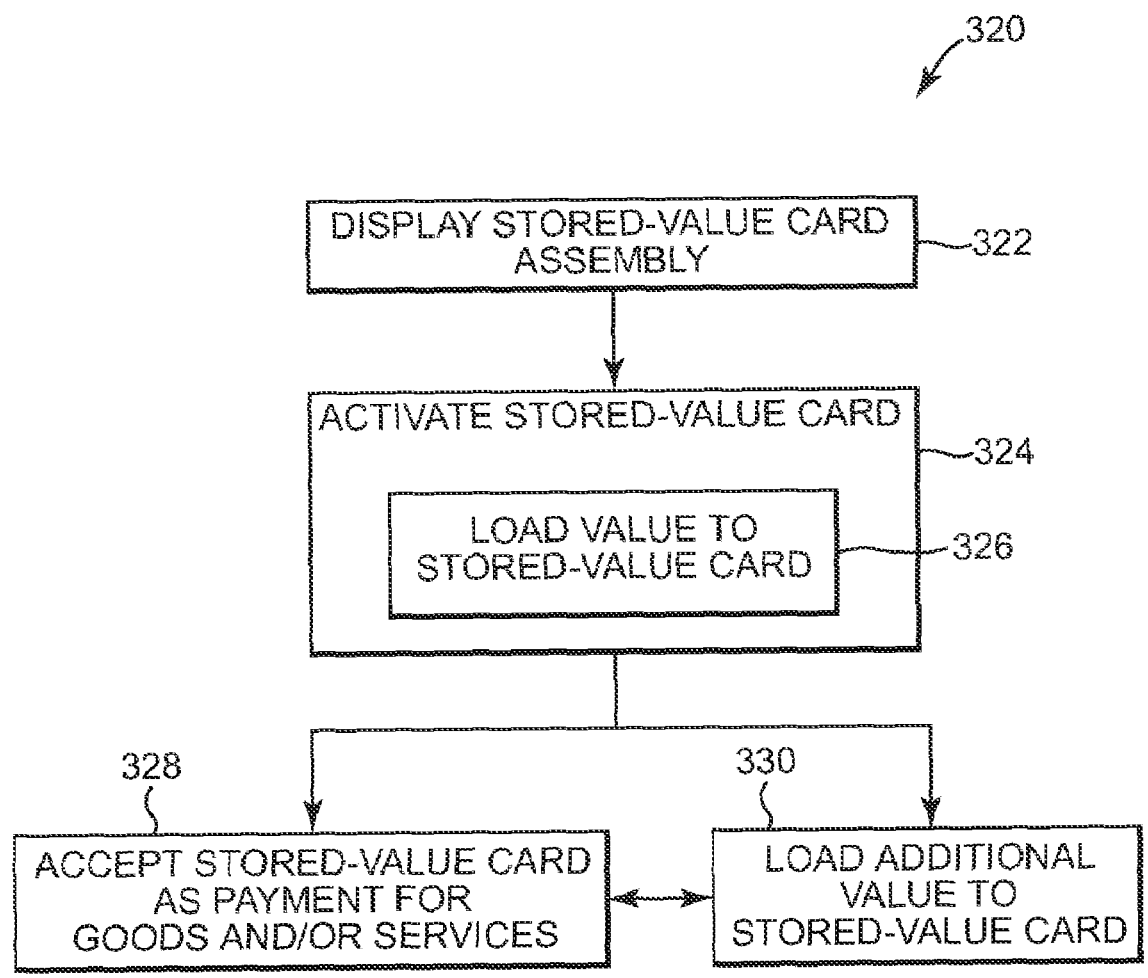
FIG. 6 is a flow chart illustrating one embodiment of a method of providing a stored-value card, according to the present invention.

FIG. 6 is a flow chart illustrating one embodiment of a method 300 of assembling stored-value card 10 with backer 100. Additionally referring to FIG. 1A, at 302, stored-value card 10 is assembled. At 304, bubble wand 14 is coupled with second housing member 18. More specifically, first end 84 of bubble wand 14 is received by coupling feature 76 of second housing member and secured via snap fit, with adhesive, or in any other suitable manner.

At 306, package 90, if any, is placed within cavity 70 of second housing member 18. In one example, second housing member 18 is opaque such that packet 90 is substantially hidden from view when placed therein. Before, after, or simultaneously with operations 304 and 306, face panel 52 is applied to outside surface 48 first housing member 16 at 308. At 310, first and second housing members 16 and 18 are slid and coupled together. More specifically, flange 36 of first housing member 16 is received by area of reduced thickness 74 of second housing member 18. As such, housing members 16 and 18 are coupled together via a friction fit.

At 312, the assembled stored-value card 10 is coupled with backer 100 to form a stored-value card assembly 160 (FIG. 4B). In one example, stored-value card 10 is coupled to backer 100 with an adhesive or other selectively releasable material or device such that account identifier 40 is viewable through opening 134 of backer 100 as illustrated in FIG. 4B. In one embodiment, backer 100 is folded into a folded position for shipment and/or display to retail settings. Backer 100 is, more specifically, folded by folding backer 100 about fold line(s) 110 to mate the backer surfaces illustrated in FIG. 4B. As such, a portion of backer 100 with stored-value card 10 is visible from one side of folded backer 100. Backer 100 can also be folded in the opposite direction about fold line(s) 110 to substantially enclosed stored-value card 10. In one embodiment, backer 100 is displayed in an unfolded position hung from a support arm via support arm aperture 108.

Figure 7:
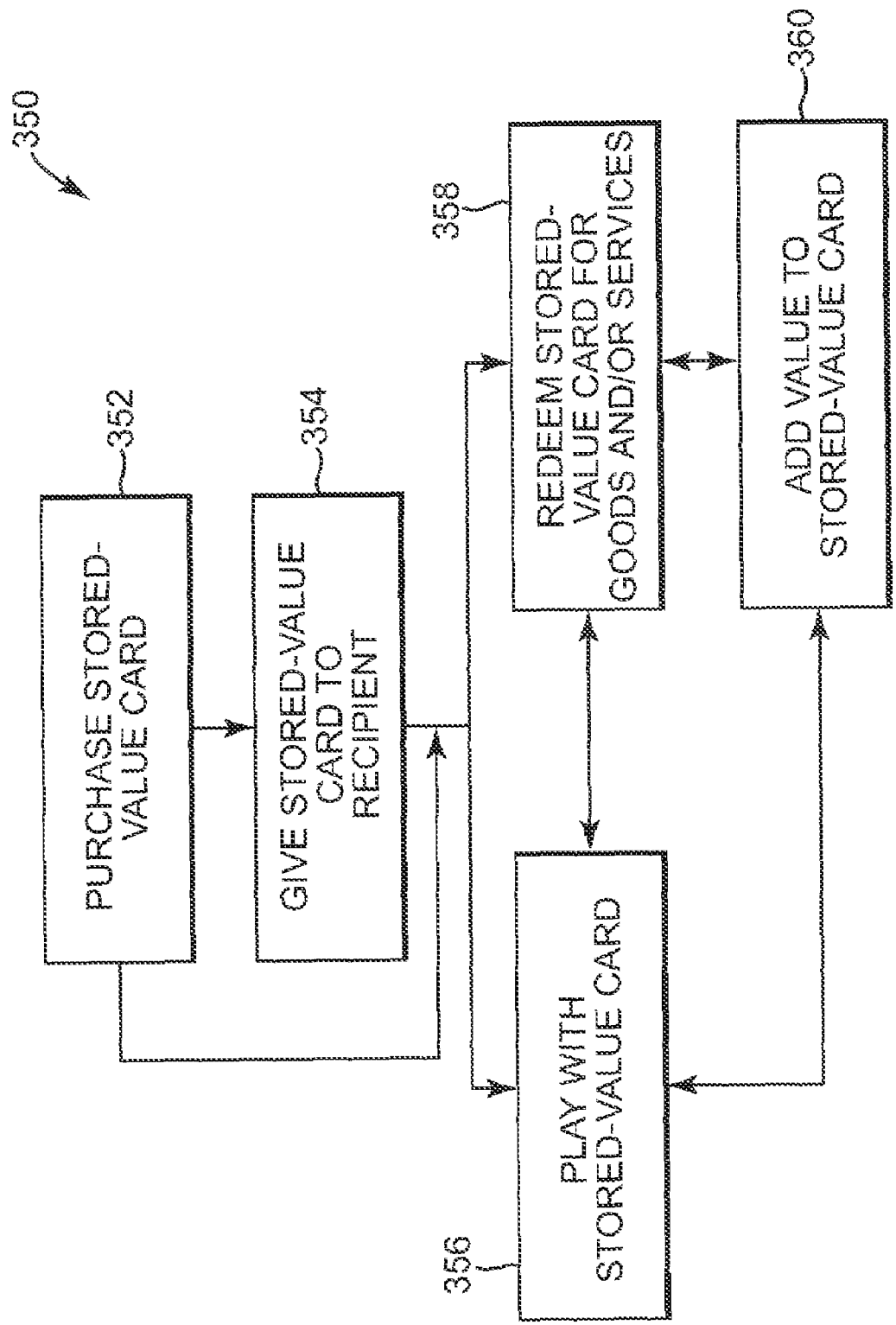
FIG. 7 is a flow chart illustrating one embodiment of a method of using a stored-value card, according to the present invention.

FIG. 7 is a flow chart illustrating one embodiment of a method 320 of providing stored-value card assembly 160 for sale to and for use by consumers. At 322, stored-value card assembly 160 is placed or hung from a rack, shelf, or similar device to display stored-value card assembly 160 for sale to potential consumers. In one example, stored-value card assembly 160 is placed for sale such that stored-value card 10 is visible to potential consumers. In one embodiment, a depiction of stored-value card assembly 160 is placed on a website for viewing and purchase by potential consumers. In one embodiment, stored-value card 10 is displayed without backer 100.

At 324, a consumer, who has decided to purchase stored-value card 10, presents stored-value card assembly 160 or at least stored-value card 10 to a retail store employee, retail store kiosk, or other person or device to scan account identifier 40 of stored-value card 10 through opening 134 in backer 100 to access the financial account or record linked to account identifier 40. Upon accessing the financial account or record, the account or record is accessed and value is added to the financial account or record at 326. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website.

At 328, the retail store or other affiliated retail setting or website accepts stored-value card 10 as payment towards the purchase of goods and/or services made by the current bearer of stored-value card 10. In particular, the value currently loaded on stored-value card 10 is applied towards the purchase of goods and/or services. At 330, additional value is optionally loaded on stored-value card 10 at a point-of-sale terminal, kiosk, or other area of the retail store or related setting. Upon accepting stored-value card 10 as payment at 328, the retail store or related setting can subsequently perform either operation 328 again or operation 330 as requested by a current bearer of stored-value card 10. Similarly, upon loading additional value to stored-value card 10 at 330, the retail store or related setting can subsequently perform either operation 330 again or operation 328. In one example, the ability to accept stored-value card 10 as payment for goods and/or services is limited by whether the financial account or record associated with stored-value card 10 has any value at the time of attempted redemption.

FIG. 8 is a flow chart illustrating one embodiment of a method 350 of using stored-value card 10. At 352, a potential consumer of stored-value card 10, which is displayed in a retail store or viewed on a website, decides to and does purchase stored-value card 10 from the retail store or website setting. Stored-value card 10 can be displayed and purchased alone or as part of the stored-value card assembly 160. Upon purchasing of stored-value card 10, a retail store employee, retail store kiosk, or other person scans account identifier 40 and to thereby activate or load value onto stored-value card 10.

At 354, the consumer optionally gives stored-value card 10 to a recipient, such as a graduate, relative, friend, expectant parents, one having a recent or impending birthday, a couple having a recent or impending anniversary, etc. As an alternative, the consumer can keep stored-value card 10 for his or her own use.

At 356, the consumer or recipient, whoever is in current ownership or otherwise is the current bearer of stored-value card 10, plays with stored-value card 10. More specifically, the bearer removes stored-value card 10 from backer 100, if stored-value card 10 is coupled with backer 100. The bearer opens housing 12 by separating first housing member 16 from second housing member 18. Otherwise stated, the bearer grasps second housing member 16 to moves bubble wand 14 from a first position within housing 12 to a second position outside of housing 12. In this manner, second housing member is one example of means for handling bubble wand 14.

Subsequently, the bearer can mix the bubble solution in chamber 32 of first housing member 16 and use bubble wand 14 with the resultant bubble solution to create bubbles, thereby, entertaining the bearer of stored-value card and other observers. In view of the above, housing 32 is one example of means for defining a bubble solution. Further, bubble wand 14 is one example of means for blowing a bubble with a bubble solution, and housing 12 is one example of means for enclosing bubble wand 14

At 358, the current bearer of stored-value card 10 redeems stored-value card 10 for goods and/or services from the retail store or website. At 360, the current bearer of stored-value card 10 optionally adds value to stored-value card 10, and more particularly, to the financial account or financial record associated with stored-value card 10, at the retail store or over the Internet. Upon playing with stored-value card 10 at 356, redeeming stored-value card 10 at 358, or adding value to stored-value card 10 at 360, the current bearer of stored-value card 10 subsequently can perform any of operations 356, 358, or 360 as desired. In one embodiment, the ability of the current bearer to repeat redeeming stored-value card 10 at 358 is limited by whether the financial account or record associated with stored-value card 10 has any value at the time of attempted redemption.

Although described above as occurring at single retail store or website, in one embodiment, purchasing stored-value card 10 at 352, redeeming stored-value card 10 at 358, and adding value to stored-value card 10 at 360, can each be performed at any one of a number of stores adapted to accept stored-value card 10 or over the Internet. In one example, the number of stores are each a part of a chain or similarly branded stores. In one example, the number of stores includes at least one website and/or at least one conventional brick and mortar store.

Stored-value cards come in many forms, according to embodiments of the invention. The gift card, like other stored-value cards, can be "recharged" or "reloaded" at the direction of the original consumer, the gift recipient, or third party. The term "loading on" or "loaded on" herein should be interpreted to include adding the balance of a financial account or record associated with a stored-value card. The balance associated with a stored-value card declines as the card is used, encouraging repeat visits. The card remains in the users purse or wallet, serving as an advertisement or reminder to revisit the associated merchant. Gift card, according to embodiment so the invention, providing a number of advantages to both the consumer and the merchant. Other gift cards and stored-value cards according to embodiments of the invention include loyalty cards, merchandise return cards, electronic gift certificates, employee cards, frequent c cards, pre-paid cards and other types of cards associated with or representing purchasing power or monetary value, for example.

Although the invention has been described to particular embodiments, such embodiments are for illustrative purposes only and should not be considered to limit the invention. Various alternatives and changes will be apparent to those with ordinary skills in the art. Other modifications within the scope of the invention in its vary embodiments will be apparent of ordinary skill.

What is claimed is:

1. A stored-value card comprising: a first housing member defining a chamber; a second housing member defining a cavity and being selectively coupled and uncoupled with the first housing member to place the chamber and cavity in contacting relationship with each other and to collectively define a housing by enclosing the chamber and the cavity between the first and the second housing member, wherein repeatedly coupling and uncoupling of the housing members provides selective access to at least one of the chamber and the cavity, and wherein at least one cardholder accessible amusement item is stored within the housing; an account identifier fixedly connected to the housing, wherein the account identifier is machine readable and adapted to link the stored-value card to a financial account or a record of financial transactions that maintains a monetary balance associated therewith, wherein machine reading of the account identifier enables the stored-value card to be used towards the purchase of one or more goods or services.

2. The stored-value card of claim 1, wherein the account identifier includes one of a bar code, a magnetic strip, a smart chip, and a radio frequency identification device.

3. The stored-value card of claim 1, further comprising an article enclosed within the housing.

4. The stored-value card of claim 3, wherein the article is at least partially maintained within each of the chamber and the cavity.

5. The stored-value card of claim 3, wherein the article is coupled to the second housing member.

6. The stored-value card of claim 5, wherein the article includes a shaft extending from the second housing member into the chamber of the first housing member.

7. The stored-value card of claim 6, wherein the article is a bubble wand, and the chamber is configured to maintain a bubble solution.

8. The stored-value card of claim 3, wherein the article includes a packet.

9. The stored-value card of claim 1, wherein the housing defines a substantially rectangular shape.

10. A stored-value card comprising: a first housing member defining a chamber; a second housing member defining a cavity and being selectively coupled and uncoupled with the first housing member to place the chamber and cavity in contacting relationship with each other to collectively define a housing by enclosing the chamber and the cavity between the first housing member and the second housing member, wherein repeatedly coupling and uncoupling of the housing members provides selective access to at least one of the chamber and the cavity, and wherein at least one cardholder accessible amusement item is stored within the housing; wherein the first housing member defines a flange, and the second housing member defines an area of reduced thickness, and wherein the flange is received by an area of reduced thickness when the first housing member is coupled with the second housing member; and an account identifier fixedly connected to the housing, wherein the account identifier is machine readable and adapted to link the stored-value card to a financial account or a record of financial transactions that maintains a monetary balance associated therewith; wherein machine reading of the account identifier enables the stored-value card to be used towards the purchase of one or more goods or services.

11. The stored-value card of claim 1, wherein at least one of the first housing member and the second housing member is one of transparent and translucent.

12. The stored-value card of claim 1, wherein the housing is substantially rectangular and the first housing member independently defines a first side of the housing, and the second housing member independently defines a second side of the housing opposite the first side.

13. The stored-value card of claim 12, wherein a portion of the first housing member is received within the cavity of the second housing member when the first housing member is coupled to the second housing member.

14. The stored-value card of claim 1, wherein the first housing member and the second housing member each have a similar width.

15. The stored-value card of claim 1, wherein the first housing member and the second housing member couple together with a friction fit.

16. The stored-value card of claim 1, wherein the account identifier is printed to the housing.

17. A financial transaction card comprising: means for defining a storage chamber and an opening to the storage chamber; means for covering and extending around an outside of the opening to the storage chamber, wherein the means for covering and extending defines a cavity, wherein the means for defining the storage chamber and the means for covering and extending are selectively couplable and uncouplable with one another to place the means for defining and the means for covering and extending in contacting relationship to collectively define a housing, and wherein repeatedly coupling and uncoupling of the means for defining the storage chamber and means for covering and extending permit selective access to the housing, and wherein at least one cardholder accessible amusement item is stored within the housing; means for linking the financial transaction card to a financial account or a record of financial transactions that maintains a monetary balance associated therewith fixedly connected to the financial transaction card such that machine reading of the means for linking enables the card to be used as tender towards the purchase of one or more goods or services.

18. The financial transaction card of claim 17, further comprising at least one item at least partially maintained within the storage chamber.

19. The financial transaction card of claim 17, wherein the means for covering and extending around the outside of the opening defines a cavity for at least partially maintaining at least one item.

20. A method of encouraging purchase and facilitating use of a financial transaction card linked to a financial account or a record of financial transactions that maintains a monetary balance associated therewith via an account identifier fixedly connected thereto, the method comprising: displaying a financial transaction card to a potential consumer, the financial transaction card including an enclosure including two pieces in contact collectively defining a housing, a first of the two pieces defining a chamber and a second of the two pieces defining a cavity, the two pieces being repeatedly couplable and uncouplable relative to another to selectively allow and restrict user access to the housing, the two pieces storing at least one amusement item in the housing, wherein the at least one amusement item is removable and formed separately from the housing and is at least partially maintained within each of the two pieces of the enclosure; activating the financial transaction card to permit deductions from the financial account or record of financial transactions via machine reading of an account identifier fixedly attached to the card for payment towards one or more goods or services, a value of the goods or services being deducted from the monetary balance.

21. The stored-value card of claim 1, wherein the first housing member is entirely separated and freely movable away from the second housing member when the first housing member and the second housing member are uncoupled from one another.

22. The financial transaction card of claim 17, wherein the means for defining the storage chamber and the means for covering and extending around the outside of the opening are readily removably coupled to one another such that the opening to the storage chamber can be repeatedly covered and exposed by removing one of the means for defining the storage chamber and the means for covering and extending around the outside of the opening from the other of the means for defining the storage chamber and the means for covering and extending around the outside of the opening.

* * * * *